United States Patent
Yashchin et al.

(10) Patent No.: US 7,200,635 B2
(45) Date of Patent: Apr. 3, 2007

(54) SMART MESSENGER

(75) Inventors: Emmanuel Yashchin, Yorktown Heights, NY (US); Sara H. Basson, White Plains, NY (US); Dimitri Kanevsky, Ossining, NY (US); Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/040,474

(22) Filed: Jan. 9, 2002

(65) Prior Publication Data

US 2003/0131055 A1    Jul. 10, 2003

(51) Int. Cl.
*G06F 15/16*    (2006.01)

(52) U.S. Cl. ............. 709/206; 709/204; 709/224; 707/9

(58) Field of Classification Search ............. 709/204, 709/206, 224, 9
See application file for complete search history.

(56) References Cited

U.S. PATENT DOCUMENTS

| | | | | |
|---|---|---|---|---|
| 5,508,695 A | * | 4/1996 | Nelson et al. | 340/825.37 |
| 5,774,525 A | * | 6/1998 | Kanevsky et al. | 379/88.02 |
| 5,815,830 A | * | 9/1998 | Anthony | 707/6 |
| 5,875,302 A | * | 2/1999 | Obhan | 709/225 |
| 6,006,175 A | * | 12/1999 | Holzrichter | 704/208 |
| 6,016,476 A | * | 1/2000 | Maes et al. | 705/1 |
| 6,034,970 A | * | 3/2000 | Levac et al. | 370/466 |
| 6,104,989 A | * | 8/2000 | Kanevsky et al. | 704/9 |
| 6,154,764 A | * | 11/2000 | Nitta et al. | 709/200 |
| 6,212,548 B1 | * | 4/2001 | DeSimone et al. | 709/204 |
| 6,233,570 B1 | * | 5/2001 | Horvitz et al. | 706/11 |
| 6,393,460 B1 | * | 5/2002 | Gruen et al. | 709/204 |

(Continued)

FOREIGN PATENT DOCUMENTS

| | | | | |
|---|---|---|---|---|
| KR | 2003003793 A | * | 1/2003 | |
| WO | WO02093414 | * | 11/2002 | |

OTHER PUBLICATIONS

Vronay, D. et al. Alternative interfaces for chat. 1999. ACM Press. Proceedings of the 12th annual ACM symposium on User interface software and technology. pp. 19-26.*

*Primary Examiner*—Saleh Najjar
*Assistant Examiner*—Alicia Baturay
(74) *Attorney, Agent, or Firm*—Whitham, Curtis, Christofferson & Cook, PC; Stephen C. Kaufman

(57) ABSTRACT

A method and apparatus improve the synchronization and presentation of an exchange of messages between two or more users during an on-line Internet messaging session. This method and apparatus discriminate which messages from a sender correspond to replies from a recipient and presents these messages in an orderly, time-sequenced fashion using color schemes or separate presentation windows which improves the overall readability and efficiency of the communication. Additionally, the method and apparatus provide a level of identity security. As a user enters messages, the typing style, speech patterns, or biometrics of all the users are monitored and will issue warnings whenever a change is detected, possibly indicating someone other then the original user is now sending messages. Alternatively, or in addition, a user may be asked a series of random questions and another user will evaluate answers provided to those questions to determine whether a user's identity is false.

11 Claims, 9 Drawing Sheets

U.S. PATENT DOCUMENTS

| | | | |
|---|---|---|---|
| 6,421,453 B1* | 7/2002 | Kanevsky et al. | 382/115 |
| 6,484,196 B1* | 11/2002 | Maurille | 709/206 |
| 6,490,548 B1* | 12/2002 | Engel | 704/10 |
| 6,557,027 B1* | 4/2003 | Cragun | 709/204 |
| 6,574,624 B1* | 6/2003 | Johnson et al. | 707/5 |
| 6,584,181 B1* | 6/2003 | Aktas et al. | 379/88.23 |
| 6,603,921 B1* | 8/2003 | Kanevsky et al. | 386/96 |
| 6,606,644 B1* | 8/2003 | Ford et al. | 709/203 |
| 6,629,087 B1* | 9/2003 | Benson et al. | 706/11 |
| 6,668,169 B2* | 12/2003 | Burgan et al. | 455/435.1 |
| 6,678,698 B2* | 1/2004 | Fredell et al. | 707/104.1 |
| 6,792,448 B1* | 9/2004 | Smith | 709/204 |
| 6,907,447 B1* | 6/2005 | Cooperman et al. | 709/203 |
| 2001/0028364 A1* | 10/2001 | Fredell et al. | 345/751 |
| 2002/0099775 A1* | 7/2002 | Gupta et al. | 709/205 |
| 2002/0099777 A1* | 7/2002 | Gupta et al. | 709/206 |
| 2002/0152117 A1* | 10/2002 | Cristofalo et al. | 705/14 |
| 2002/0154172 A1* | 10/2002 | Linsey et al. | 345/804 |
| 2003/0023684 A1* | 1/2003 | Brown et al. | 709/204 |
| 2003/0120720 A1* | 6/2003 | Montero | 709/203 |
| 2003/0126089 A1* | 7/2003 | Fukuoka et al. | 705/54 |
| 2003/0212746 A1* | 11/2003 | Fitzpatrick et al. | 709/206 |
| 2004/0078435 A1* | 4/2004 | Dunbar et al. | 709/206 |
| 2005/0235034 A1* | 10/2005 | Chen et al. | 709/206 |
| 2005/0262199 A1* | 11/2005 | Chen et al. | 709/204 |

* cited by examiner

SMART MESSENGER

CROSS-REFERENCE TO RELATED APPLICATIONS

The subject matter of this patent application is related to that of application Ser. No. 09/079,754 for "Apparatus and Method for User Recognition Employing Behavioral Passwords", filed on May 15, 1998, by D. Kanevsky and S. Maes, application Ser. No. 09/108,544 for "Audio/Video Archive and Method for Automatic Indexing and Searching", filed Jul. 1, 1998, by D. Kanevsky, M. Padmanabhan, A R Zingher, and S. Maes, and application Ser. No. 09/437,971 for "Methods and apparatus for semantic unit based automatic indexing and searching in data archive systems", filed Nov. 10, 1999, by J C Chen and D. Kanevsky both of which are assigned to a common assignee herewith. The disclosures of applications Ser. No. 09/079,754, Ser. No. 09/108,544, and Ser. No. 09/437,971 are incorporated herein by reference.

DESCRIPTION

BACKGROUND OF THE INVENTION

1. Field of the Invention

The present invention generally relates to improvements to network messaging systems and, more particularly, to identification, sequencing, and presentation of user-to-user messages when using services such as Instant Messenger or ICQ.

2. Background Description

There exist several problems with current internet messaging systems such as Instant Messenger and ICQ, a free software chat and messaging system. The first problem is that when people write long messages and send several messages to the same person over a short period of time, and the recipient replies to these messages, then several topics may be discussed within one session and this may confise the sender/recipients because it may become unclear as to which question the recipient has just replied. For example, a person may send a message with the question, "What are you doing tomorrow night?", shortly followed by another question, "What are you doing today?" The recipient may reply, "I am going to the movies." This response may confuse the sender, as to whether the reply was to the first or second question. Although this is a simplified example, it is relatively easier to imagine more difficult scenarios when several complicated topics are being discussed in a session, the questions and replies may get easily confused. The scenario becomes infinitely more confusing when several people are involved in a "chat session".

Another typical problem with America On Line (AOL) is that if a person is away from their computer and they receive a message during this time, while a family member who knows, their screen name, sits at the computer, the family member may begin to answer as though they were the intended recipient. The disguised identity scenario may happen as a child jokingly pretending to be a parent, or a room-mate or friend pretending to be the person whose screen name identity they have assumed.

SUMMARY OF THE INVENTION

It is therefore an object of the present invention to provide a new means to monitor and detect new message topics between two or more users engaged in an on-line messaging communication with new topic messages presented in an orderly fashion whereby replies are coordinated and presented by topic and by user.

It is another object of the present invention to monitor the content of the communication and provide a level of security against harassing or undesirable topics.

It is yet another object of the invention to monitor the biometrics of the communications and determine if any party is has changed pattern signifying a possible change in identity of the sending party.

It is yet another objective of the invention to notify involved users in the communication of a possible change of a sender's identity and present a means to validate the identity of the sending party in question.

According to the invention, there is provided a collection of software modules that resides in a user's personal computer and operates in conjunction with a messaging service.

In order to solve the first problem, our invention implements a smart topic agent in the messenger. The smart topic agent uses a time synchronizer and semantic means to separate several topics within one conversation, from both sides (sender, recipient), and allows the system to discriminate which message on the part of the sender corresponds with what message from the recipient. The system may give similar themes the same color, or open a separate window for each separate topic. In our example, the system would have understood that the answer was to the first question since it had not yet received an answer. The system would have separated in its own window the series, "What are you doing tomorrow?", and the answer, "I am going to the movies." If the user felt that it may be confusing, he may create a more complicated interface by putting two questions on a similar level with arrows to the answer, "going to the movies" followed by a question mark. In this way the user sees that there is an ambiguity as to which question the answer refers.

In order to solve the second messenger problem, how to prevent disguised screen name identity, the following methods are used. The system identifies the typing style of the user, and if the style of the current sender does not resemble that of the original screen name user, the system may warn the recipient that the sender may not be the original user. The system may also ask the current sender a series of questions to which only the original screen name user would know the answers. Similarly, people who converse using messenger services on a regular basis may agree to answer a set of particular questions to which only they know the answers. In this case, the security system of the messenger service knows that the sender/recipients must exchange a series of questions, and the system knows that if these questions are not exchanged or are improperly answered, then, one of the users is incorrect.

Alternatively, or in addition, biometrics may be used to identify a sender. Specifically, voice recognition systems to identify a speaker may be used to provide security to the system. Also, using biometrics, an approximate age of a user may be estimated to provide an indication whether the sender might not be the original screen name user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
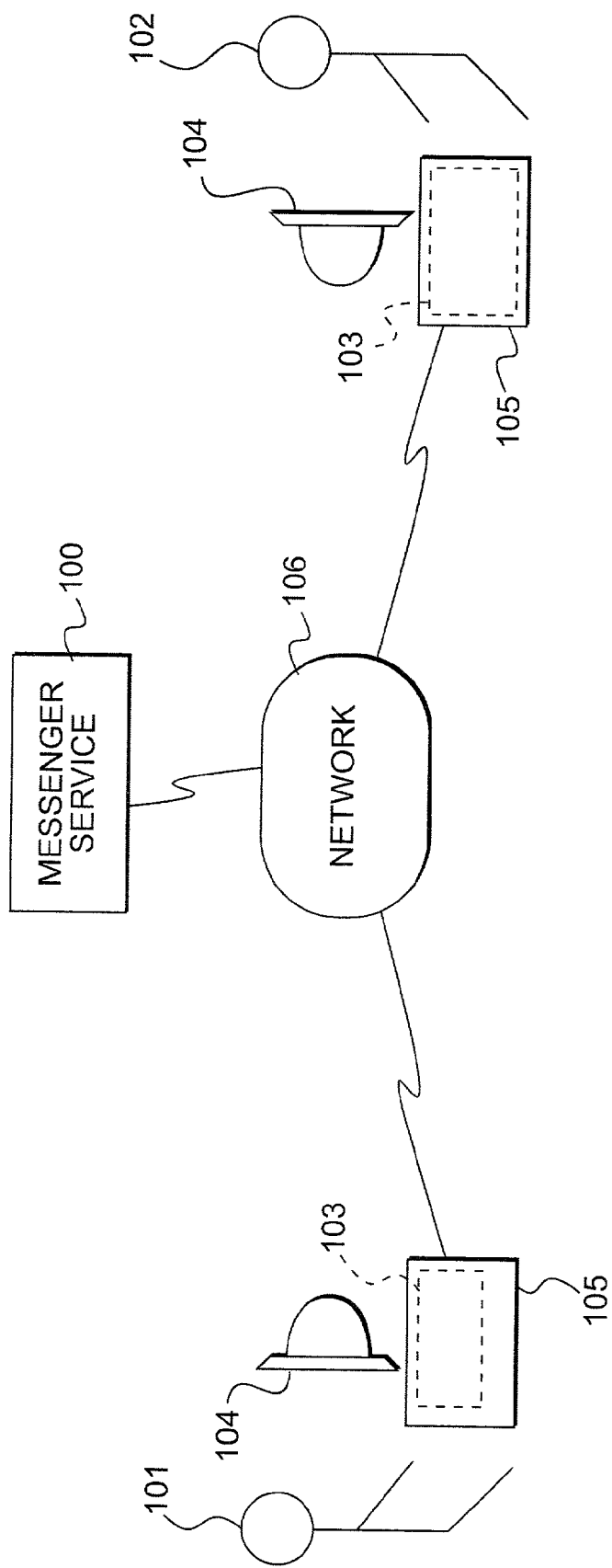
FIG. 1 is a block diagram showing the major elements of the system.

Referring now to the drawings, and more particularly to FIG. 1, there is shown a schematic representation of the invention. The messenger service 100 is utilized by user 101 and user 102 to exchange messages (e.g., AOL instant messenger, ICQ, Net Meeting, and Peer-to-Peer). Module 106 represents a network, such as the Internet, through which two or more computers 105 may be connected. Each of these computers 105 (belonging to users 101 and 102) run the messenger GUI (Graphic User Interface) application 104 and the topic separator application 103. The topic separator application 103 separates the users' messages into related topics. The messenger GUI application 104 gives different modes of presentation for messages with different topics. For example, each window may receive the same topic, or each different topic may be represented by a different color (while the same topic is represented by a single color). A computer 105 runs the topic separator, messenger GUI, and security provision applications. Although FIG. 1 shows only two users, many users may be connected during a single chat session.

Figure 2:
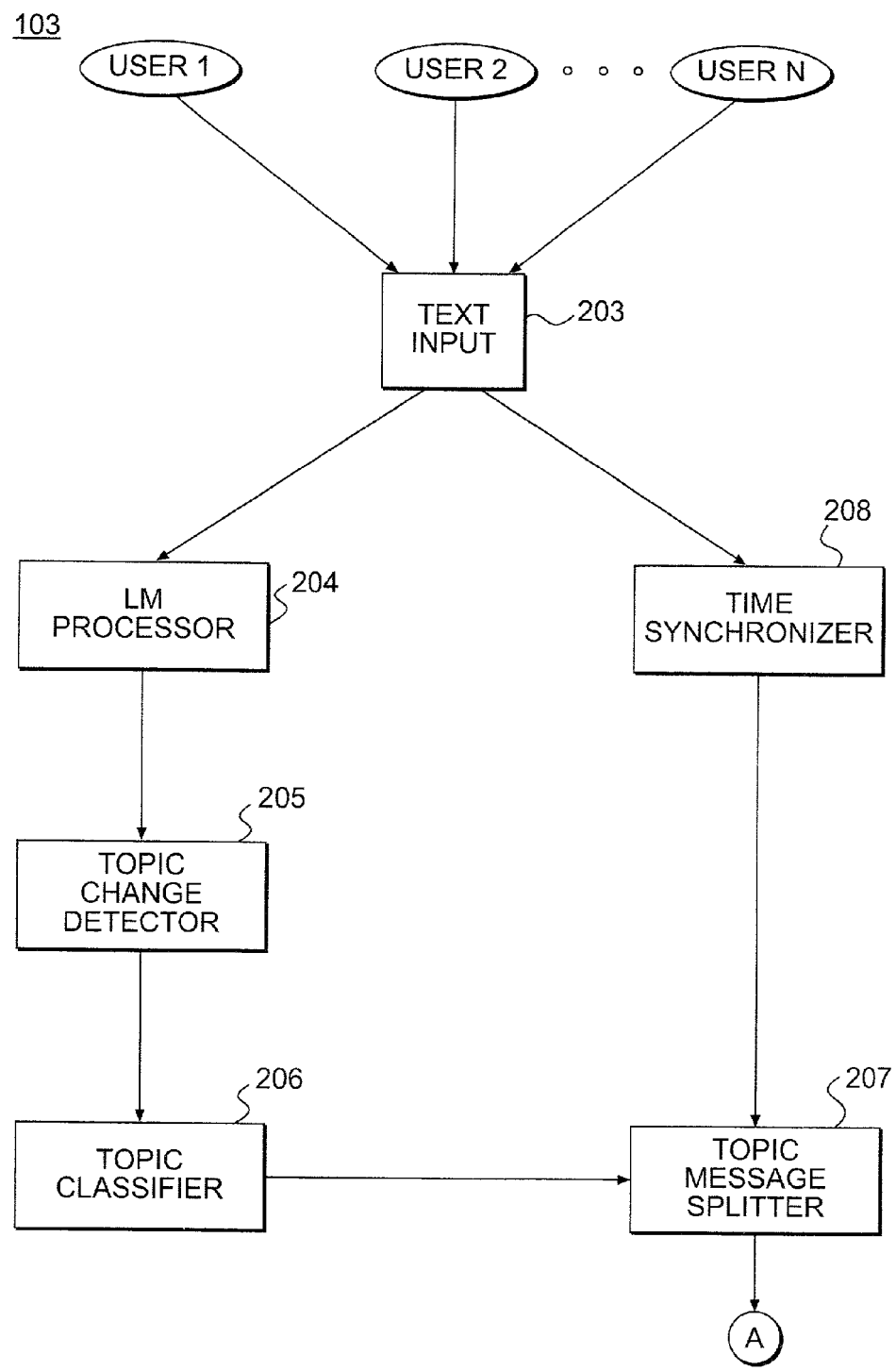
FIG. 2 is a flow diagram illustrating the logic of the topic separator.

FIG. 2 illustrates the logic of the topic separator application 103. User 1, user 2, and user N send text input 203 that associates with the time synchronizer 208 that puts a time stamp on the respective message. The time synchronizer 208 is connected to the topic message splitter 207 which associates the messages sent by different users. Therefore, according to the time stamp, it is possible to know what message of one user would relate to the message of another user. The time synchronization of messages will be explained in detail below. The topic message splitter 207 uses information from the time synchronizer 208 as well as the topic classifier 206. In this way, the messages from different users that are associated by topic and time stamp are put into a single group. Each group in module 207 is composed of messages unified by topic and time stamp. The topic classifier 206 uses module 205, the topic change detector, that determines changes in the topic of conversation. There are several ways to identify that a topic has changed, as described in U.S. Pat. No. 6,104,989 to Dimitri Kanevsky et al. for "Real time Detection of Topical Changes and Topic Identification via Likelihood Based Methods". The topic change detector 205 uses information from the language model (LM) processor 204 that receives information from the text input 203. The language model processor 204 utilizes a variety of semantic processors and language models that are associated with the text input, semantic understanding, and probabilities. These probabilities are used in the topic change detector 205. For example, if two messages are sent at different times but seem to have a mild topical relationship they are probably not related.

Figure 3:
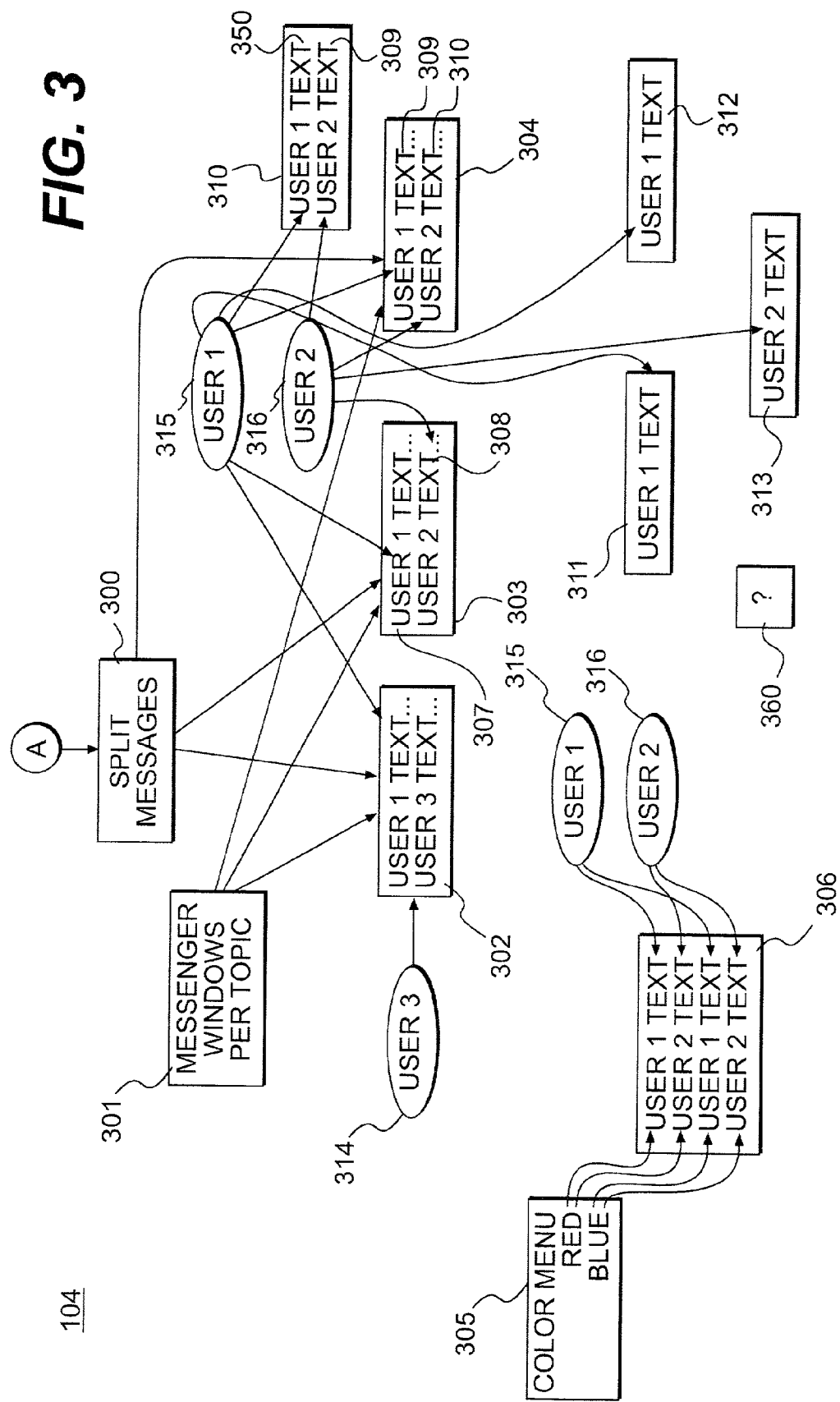
FIG. 3 is a flow diagram illustrating the logic and presentation of the messenger graphic user interface (GUI)

FIG. 3 illustrates the logic of the messenger GUI application 104. The messenger GUI application operates to split messages 300 that enter from the topic message splitter 207 (FIG. 2). The split messages enter the messenger windows per topic 301. For each split message, a new window is formulated. For example, windows 302, 303, and 304 display three different topics that may occur between several different users. Window 302 receives messages from user 3, 314, and from user 1, 315. Window 303 receives messages 307 and 308 from users 1 and 2, 315 and 316, respectively. Users 1 and 2 have another message window 310 referring to another topic with different messages 350, from user 1, and 309 from user 2. This allows users 1 and 2 to have separate windows in which they can discuss their separate topics. They may also have windows with messages 311 and 312 that correspond to user 1. User 2 has window 313 that may be tied to either window 311 and window 312. This occurs when the topic separator could not decide to which topic the message belongs, 311 or 312. Module 360 represents a question mark that may be displayed so that the users understand that the system is unsure of which topic window to place the new message.

Another method for designating the different topics is represented by module 305, a color menu box that controls the messages between users 1 and 2 that are represented by reference numerals 315 and 316 in module 306. In this module, different themes are represented by different colors. For example, user 1 has several topics that are red in color, while user 2 may have topics that are colored red and blue. Users may have the option to choose the color with which their topic is displayed, or this function may be automatically controlled by the system.

Figure 4:
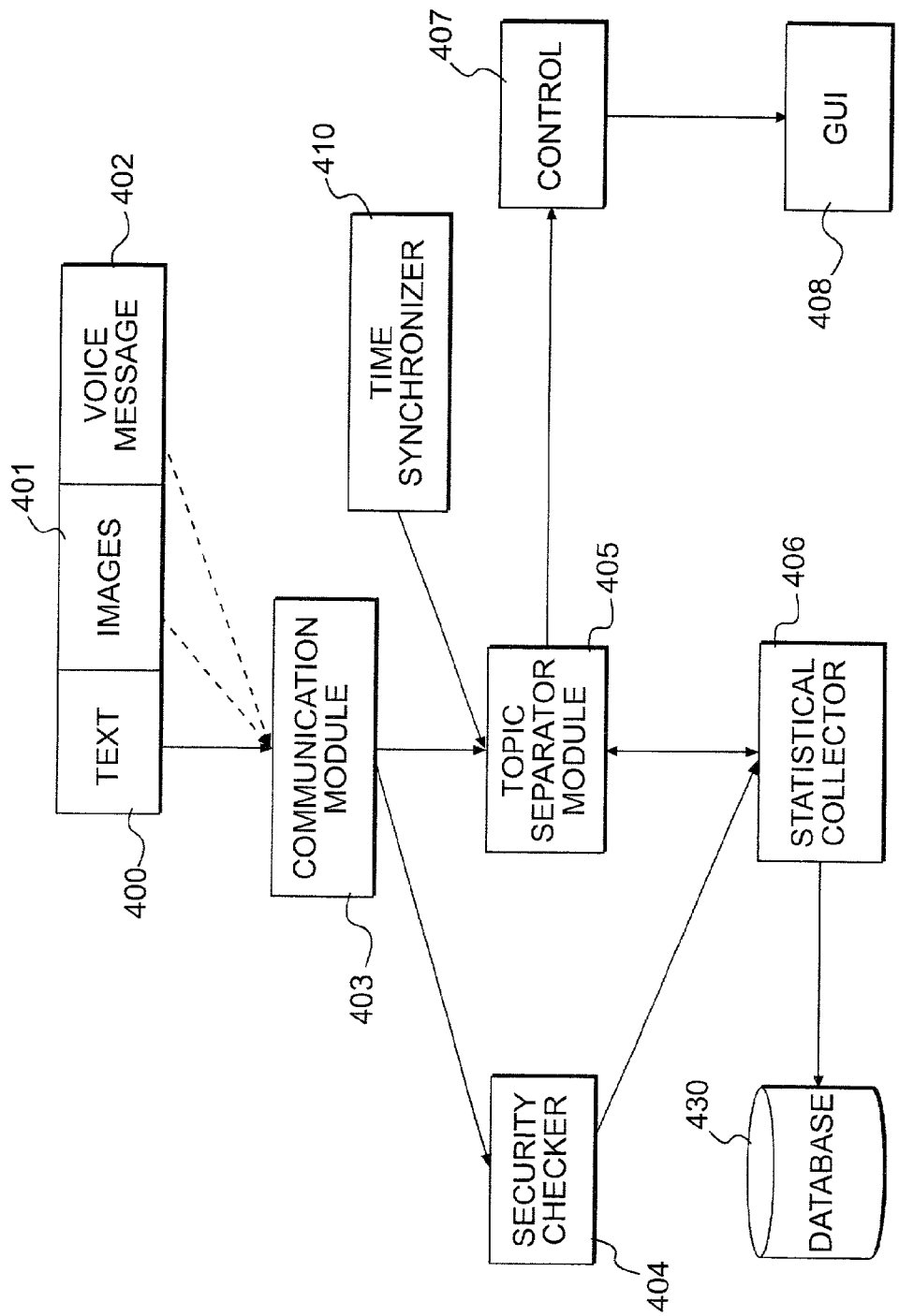
FIG. 4 is a flow diagram illustrating the process flow within a user's computer.

FIG. 4 illustrates the process performed by the computer 105 (FIG. 1) and the applications that are running on the user's computer. Input data is composed mostly of textual data 400, but may consist of images 401, and sound 402. In principle, the message may be a voice message that utilizes speech recognition to translate voice messages into text and then use the topic separator 405. This possibility is not illustrated in FIG. 1 but is possible, as may be necessary with visually impaired persons. In this case, a visually impaired person may just listen to different topics being read. The text data may also be accompanied with images 401. In this case, the topic separator must be capable of image interpretation. This means that if a person sends a text message accompanied with an image, the system utilizes the time synchronizer 410 to identify which topics have images that accompanied the text. The sound, image, and text (multimedia) combinations are illustrated in greater detail in later figures.

Module 404 represents the security checker that checks for the identification of the message sender. The security checker may also be capable of monitoring the content of the messages in order to prevent, for example, sexual or other undesirable content for a variety of reasons. Module 406 is the statistical collector module. The statistical collector may be stored in the database 430, which may be local in the user's computer, or may be stored at the messenger server. It may be later used to create a language model and for topic change detection, and the topic classification for all of the models. For the most part, it is used to create a language model characteristic unique to the particular user. Typically, this process occurs on the server. The statistical collector 406 also collects local data that is used by the topic separator module 405 on the next level of the message processing. The control device 407 uses information from the topic separator module 405 to control the GUI application 408, by creating new windows, directs text to the new windows, and controls the colors of different topics. The time synchronizer 410 is used by the topic separator 405, as was explained with reference to FIG. 3.

Figure 5:
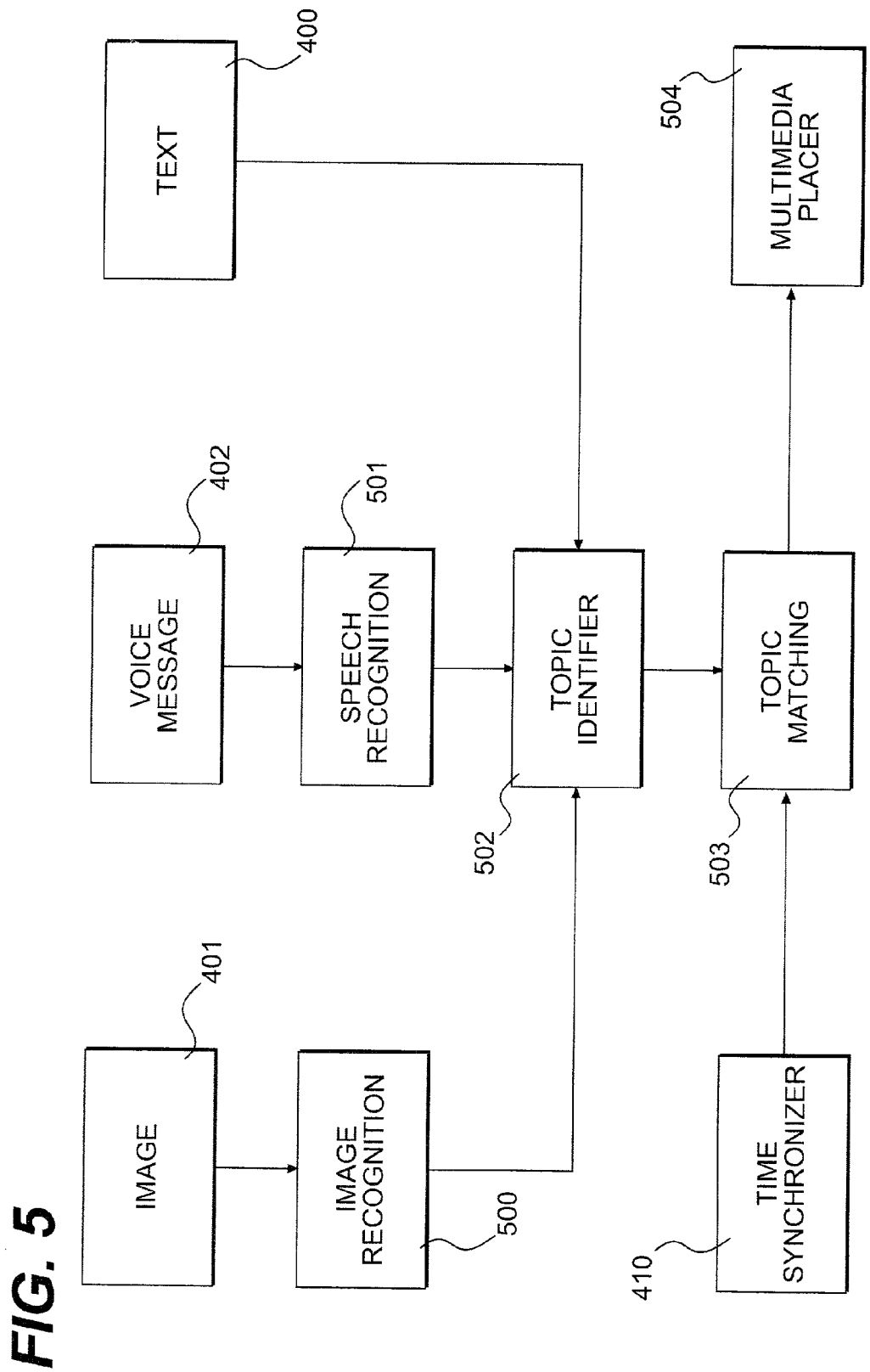
FIG. 5 is a flow diagram illustrating the process flow of the multimedia processing by the messenger service.

FIG. 5 illustrates an example of multimedia processing by the messenger server with the input of textual data, voice data and image data. In this case, image processing by the image recognition module 500 occurs as is described in co-pending patent applications Ser. No. 09/108,544 and Ser. No. 09/437,971. Voice message data 402 are processed by the speech recognition module 501. Along with the textual data, the multimedia data enters the topic identifier 502 which identifies the topic of each message group. The topic identifier functions according to the description in module 206 as well as aforementioned U.S. Pat. No. 6,104,989. Module 503 is responsible for topic matching with the help of the time synchronizer 410. Images and multimedia data are matched by topic or by time stamp. For example, if the users are discussing cars, and an image of a car is sent, the image is made to accompany the respective text. Or, if a vacation is being discussed, a photo of a vacation scene may accompany the text. In these cases, the themes are matched by topic and/or by the time synchronizer 410 to allow for images/multimedia sent at approximately the same time as a particular text was written, to be grouped together as a topic match in a single window. The multimedia placer 504 decides which window to place a piece of multimedia data in order to match the topic of a text sequence.

Figure 6:
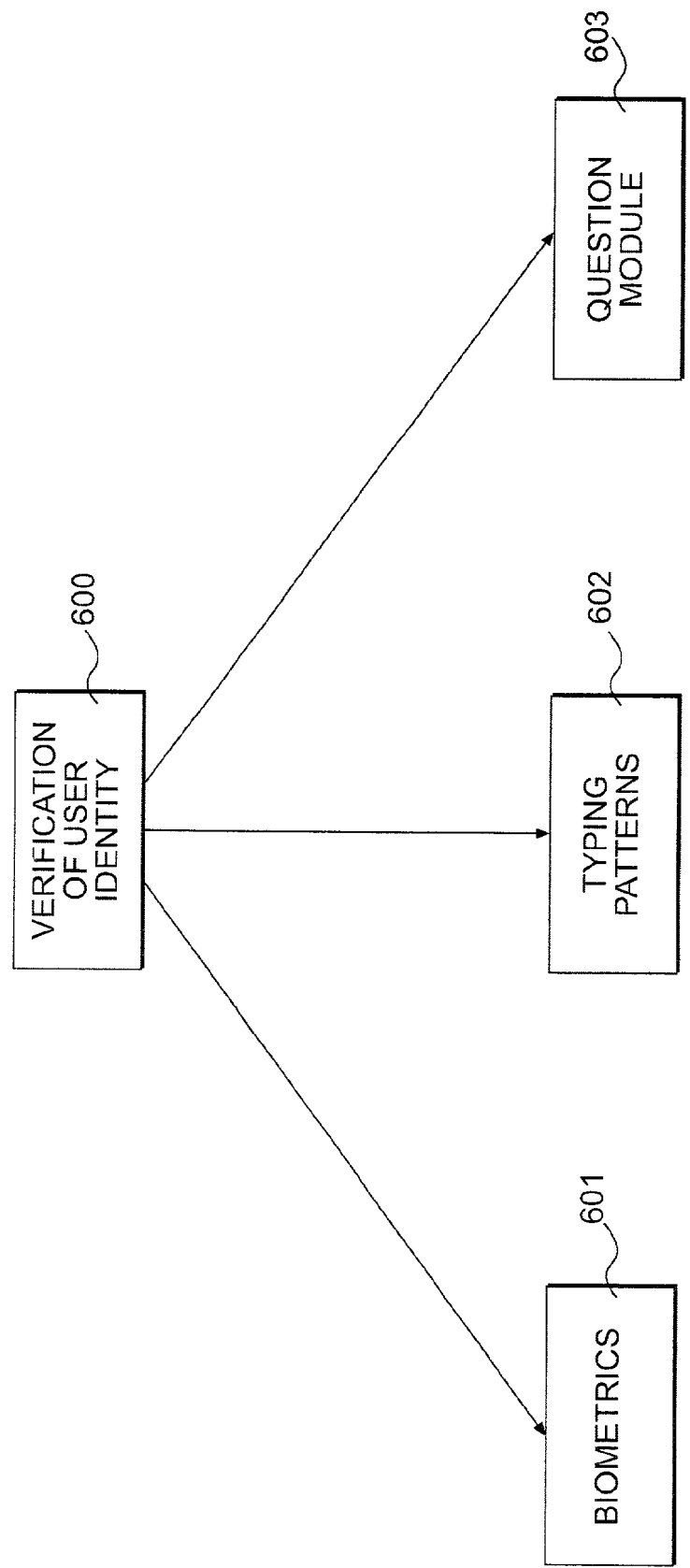
FIG. 6 is a block diagram of the security checker function.

FIG. 6 illustrates the security checker module 404 shown in FIG. 4. The verification of user identity module 600 uses biometrics 601 as described in co-pending patent application Ser. No. 09/079,754 for "Apparatus and Method for User Recognition Employing Behavioral Passwords". The biometric may use sensors that can measure the user's identity through voice, images, and other methods. Module 602 examines the user's typing patterns and compares them with previously stored typing patterns to determine if the current user is the real original one. Module 603 asks the user random questions that, when properly answered identify that the user is the real original user, as opposed to improperly answered questions that result in an identification of an incorrect user. An earlier U.S. Pat. No. 5,774,525 to Dimitri Kanevsky et. al. for "Method and Apparatus for Utilizing Dynamic Questioning to Provide Secure Access Control" discloses a similar user identification system to identify the correct user. The major difference between the two systems is that in the prior patent, the system checked the correct answer, but in this messenger system the other user checks for the correct answer. For this reason, the questions asked by the server 600 may be standard for all users, but only the recipient may know the correct answer for the sender (or question answerer). For example, the questions may be "what year were you born?", "where do you study?", and similar general questions. Module 603 may also ask questions that are specific to each user that entered their screen name, or to both users; therefore, both users must be capable of answering the questions. The information for the questions and answers may be kept on a server, either local or remote.

Figure 7:
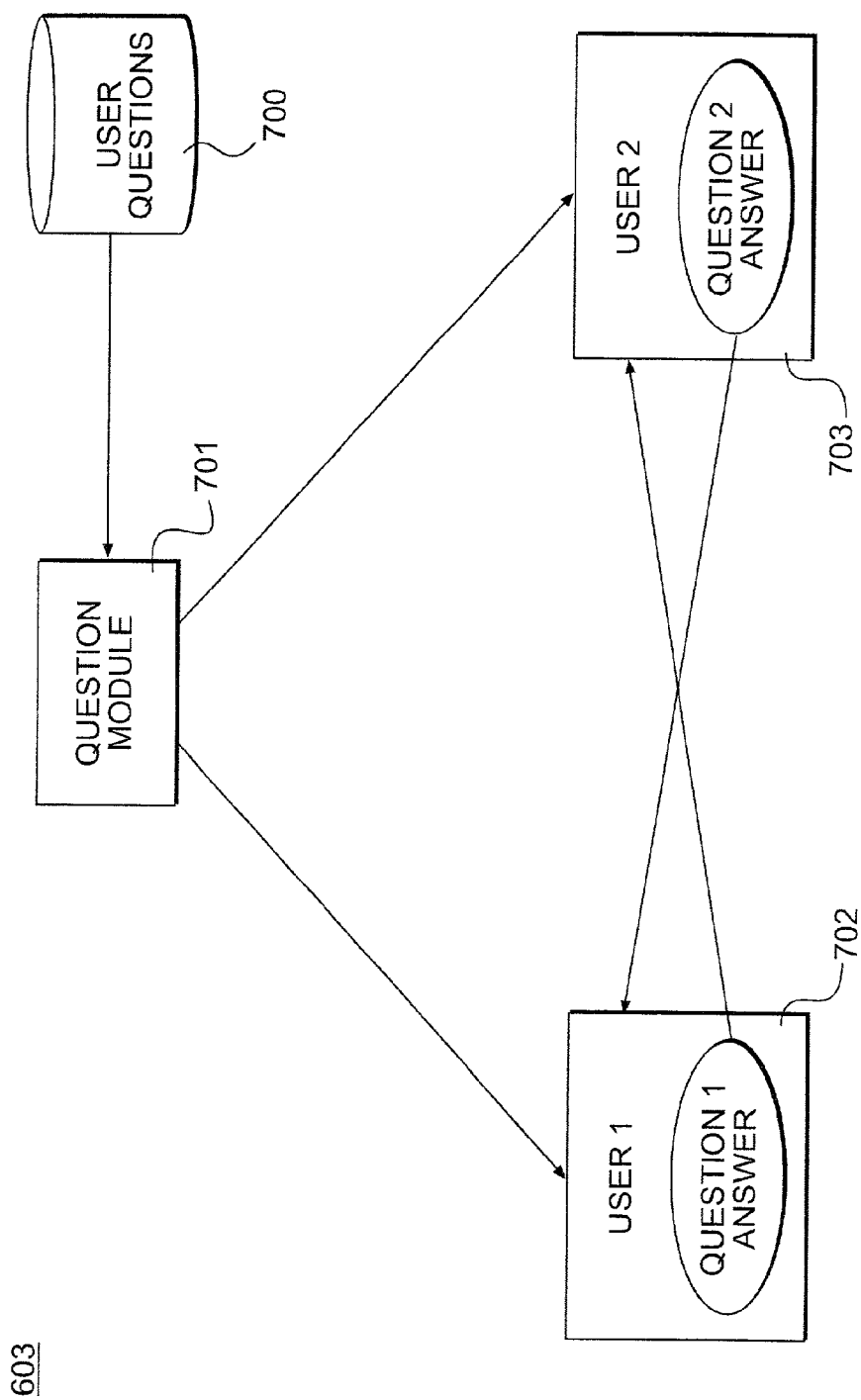
FIG. 7 is a flow diagram illustrating the process flow of the questionary function.

FIG. 7 illustrates module 603 (FIG. 6), asking random questions, in more detail. It is composed of module 700, the database of user questions, both specific and general questions. This module 700 is connected to the question module 701, which searches the database for the correct questions, functioning according to U.S. Pat. No. 5,774,525. Modules 702 and 703 illustrate the interactions between users. User 1 receives a question from the question module 701, the question/answer will then be relayed to user 2. Similarly, user 2 receives a question, whose answer is automatically sent (without the ability to be changed by user 2) to user 1 for verification of identity. If the answers are correct (as decided by the users themselves), then the conversation may go on. The general idea is that it is the choice of the users to accept the correct identity or ignore the incorrect identity.

Figure 8:
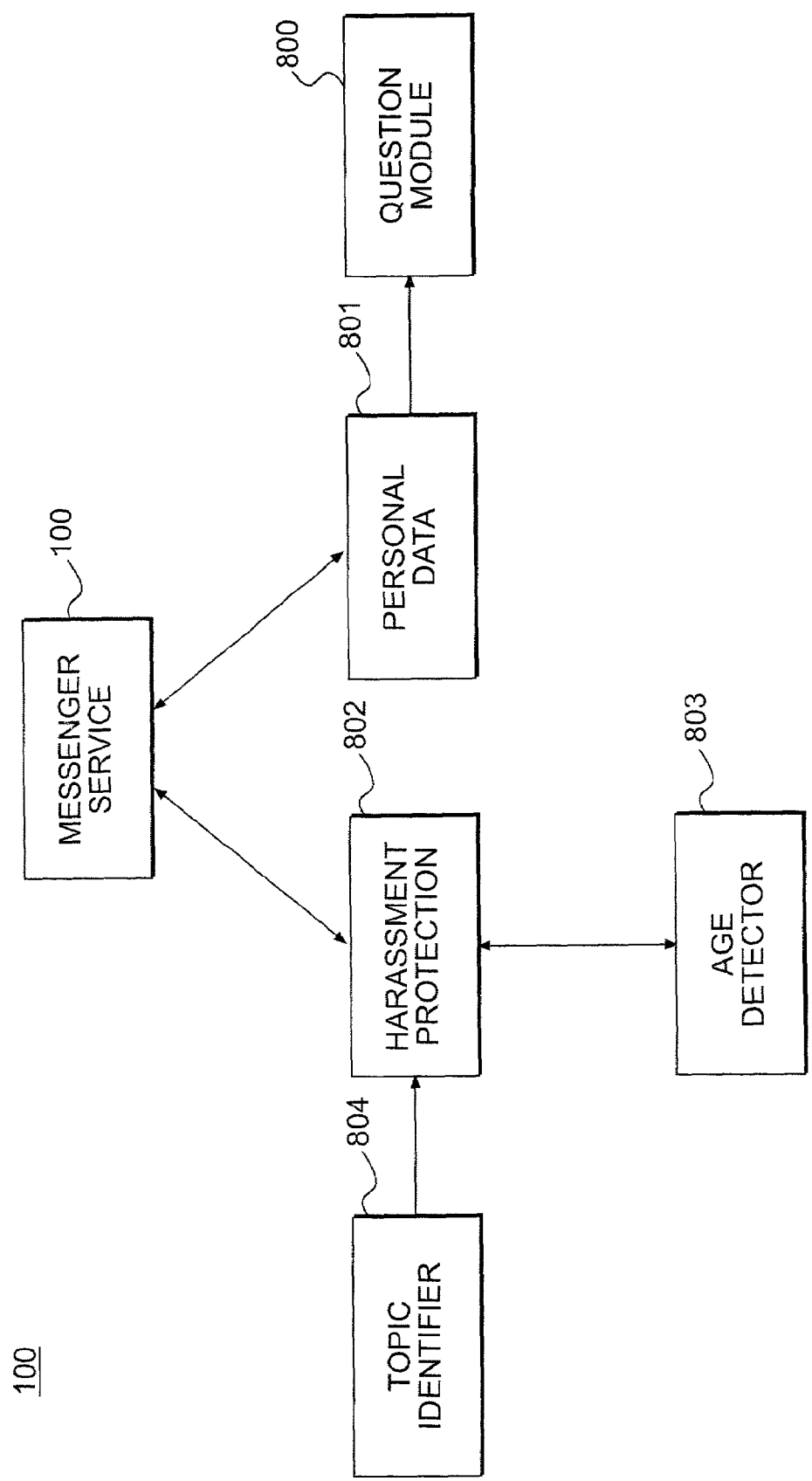
FIG. 8 is a functional block diagram of the messenger service.

FIG. 8 illustrates several of the functions of the messenger service 100. The question module 800 is used in combination with the user personal data module 801 to ask either general or specific questions of the user. In a preferred implementation of the invention, the personal data might be maintained in a central repository for storage of this information, but the invention does not require a central storage of the user's answers. The personal data might also be distributed. Questions are asked of the users in an interactive "as-needed" basis. Thus, the information is created dynamically The protection module 802 functions to prevent the sending of messages that may be construed as sexual harassment, racist, ethicist, or any similarly offensive and potentially illegal remarks. Module 803 may be utilized as an age detection module either by voice recognition, or the general flow of textual data may assist in determining the age of a user. The protection module 802 is connected to the topic analyzer 804 which determines if a specific message may be construed as offensive. Although this is not a major theme of our invention, we chose to mention it here.

Figure 9:
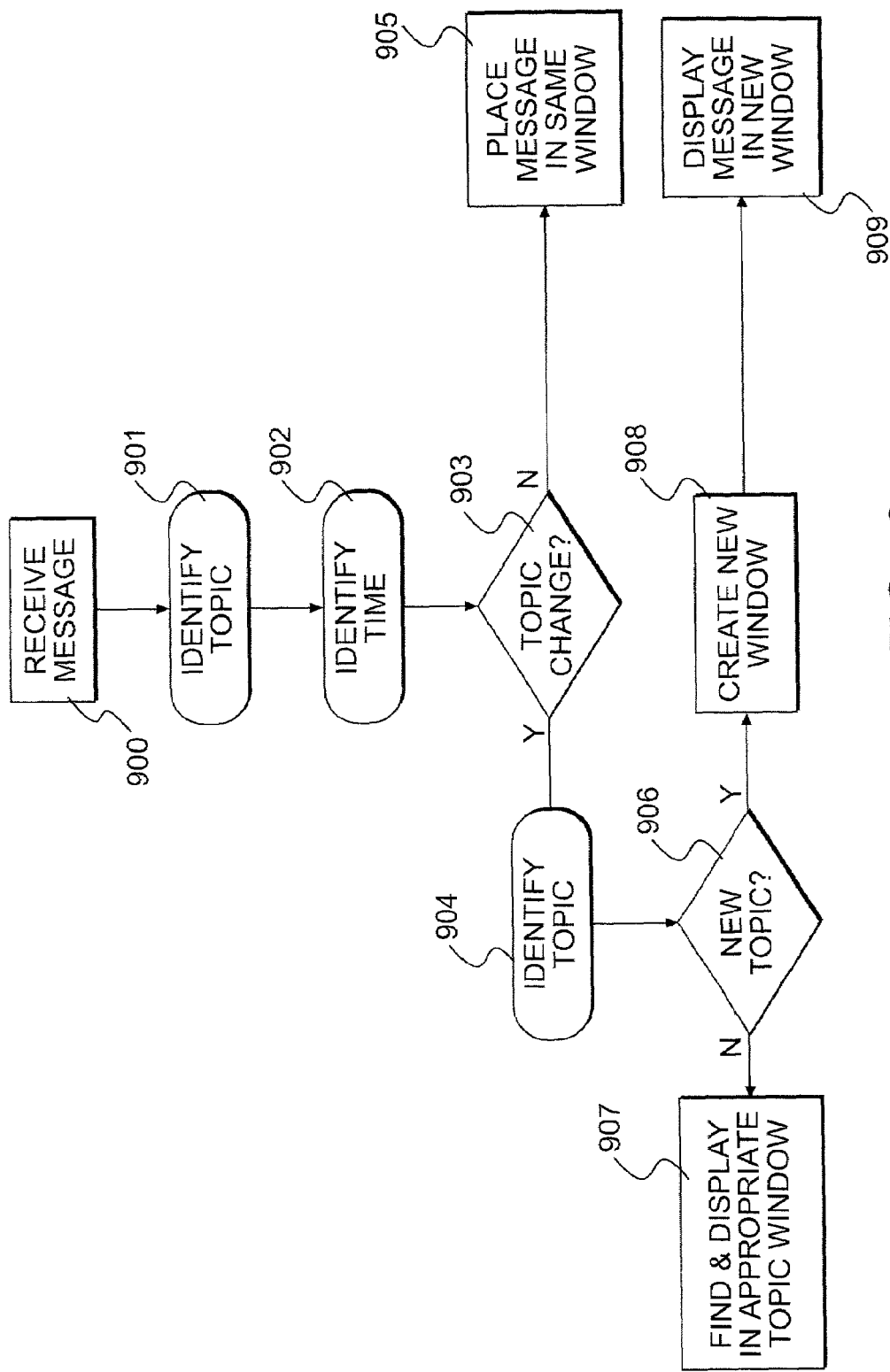
FIG. 9 is flow diagram showing the overall operation of the invention.

FIG. 9 is a flow diagram showing the invention methodology. The process begins in function block 900 when a message is received through local means via a computer. The topic of a message is identified in function block 901, and the time of a message is identified in function block 902. A determination is made in decision block 903 as to whether the topic has changed. If so, it is again necessary to identify the topic in function block 904 A determination is made in decision block 906 as to whether the topic is new. If the topic is new, then the system must create a new display window in function block 908. The message is then printed in the window in function block 909. If the different topic is not new, as determined in decision block 906, then the system finds the window pertaining to the current topic in function block 907 and prints this message in that window. If the topic did not change, as determined in decision block 903, then the system places the text from the message in the same window as displayed the previous message in function block 905.

While the invention has been described in terms of a single preferred embodiment, those skilled in the art will recognize that the invention can be practiced with modification within the spirit and scope of the appended claims.

We claim:

1. A messaging system comprising: an interactive system for the production and interchange of messages by users over a network; a time synchronizer for time stamping messages; an automated topic separator receiving user messages and separating messages according to different topics, wherein the automated topic separator includes a language-model topic classifier that estimates a topic of the user messages or parts of the user messages based, at least in part, on their respective word content, and a final topic separator which separates messages or parts of messages based on a difference between their respective estimated topics and the difference between their respective time stampings, such that messages or parts of messages are separated into different topics when said difference between their estimated topics exceeds a threshold, the threshold being based, at least in part, on the difference between their respective time stampings, and wherein the threshold, at least in part, is made smaller as said time difference increases; a user interface, coupled to said topic separator, for representing in a distinct way parts of messages that were separated by said topic separator, wherein said user interface displays at least one of said messages in windows according to topic, and messages in different colors according to topic, and wherein the user interface enables a subgroup of users to conduct a messaging session separate from other users, within a framework of an ongoing session or topic.

2. The messaging system of claim 1, further comprising a security system for verifying a user's identity.

3. The messaging system of claim 2, wherein said security system includes a database of questions from which random questions are posed to a user and whereby verification of validity of answers to posed questions is done by users of the system.

4. The messaging system of claim 2, wherein said security system includes a biometric module for verification of a user's identity.

5. A method of conducting a messaging session at a user's computer between two or more users over a network comprising the steps of:
  receiving a message over the network from a user;
  automatically estimating a topic of the received message based on words in the message;
  determining if the topic of the message is the same as a previous message, has changed from the a previous message to a previous topic, or is a new topic, based on the difference between the estimated topic of the message and the estimated topic of the previous message, and the difference between their respective time stampings, such that the threshold difference between their respective estimated topics at which the message is determined to be the same topic as the previous message changes with respect to the difference between their respective time stampings;
  and automatically
  if a new topic, opening a new window to display the received message,
  if a same topic as said previous message, displaying the message in a currently opened window, and
  if a changed topic displaying the received message in a previously opened window, and
  wherein a subgroup of users comprising at least two users conducts a messaging session separately from other users.

6. The method of claim 5, further comprising checking a user's identity.

7. The method of claim 6, wherein said checking a user's identity comprises asking the user random questions and evaluating the user's answers.

8. The method of claim 7, wherein said evaluating the user's answers includes receiving a verification input from another user.

9. The method of claim 6, wherein said checking a user's identity includes detecting user biometrics data and comparing the detected data against a stored data.

10. The messaging system of claim 1, wherein the automated topic separator generates a query data indicative of no topic being identifiable for a message, based on an output of the language model classifier or the time stamp of the message, and wherein the user interface, in response to said query data, displays a query message to at least one user indicating to the user that the topic of the message can not be decided by the topic separator.

11. The method of claim 5, wherein the automatically estimating the topic of the received message generates a query data if the tonic can not be estimated to a predetermined level, and further comprising communicating a query signal to the user in response to said query data.

* * * * *